United States Patent [19]

Scott

[11] 4,261,088

[45] Apr. 14, 1981

[54] CAST COMPRESSION RING FOR RECIPROCATING PISTONS

[76] Inventor: Alan J. Scott, 307 Third Ave., Carnegie, Pa. 15106

[21] Appl. No.: 68,553

[22] Filed: Aug. 22, 1979

[51] Int. Cl.$^3$ .............................................. B23P 15/10
[52] U.S. Cl. .................................. 29/156.5 R; 29/460; 92/172; 164/111; 164/DIG. 8; 264/273
[58] Field of Search ................... 164/111, 98, DIG. 8; 277/1, 9, 9.5, 216; 264/273; 29/460, 156.5 R; 92/172; 308/3 R, 237 R

[56] References Cited

U.S. PATENT DOCUMENTS

| | | | |
|---|---|---|---|
| 890,736 | 6/1908 | Wagner | 308/237 R |
| 1,426,913 | 8/1922 | Sackman | 164/DIG. 8 |
| 1,570,837 | 1/1926 | Hoy et al. | 164/DIG. 8 |
| 1,691,450 | 11/1928 | Soulis et al. | 164/DIG. 8 |
| 1,862,279 | 6/1932 | Sandler | 308/237 R |

*Primary Examiner*—R. L. Spruill
*Assistant Examiner*—J. Reed Batten, Jr.
*Attorney, Agent, or Firm*—William J. Ruano

[57] ABSTRACT

A method of producing a piston cylinder assembly for use in a windmill in which a compression ring is formed by casting molten metal around a piston head having a number of drilled holes on its side surface while the piston head is positioned within the cylinder. The compression ring formed is attached to the piston head by solidified metal within the drilled holes.

1 Claim, No Drawings

CAST COMPRESSION RING FOR RECIPROCATING PISTONS

The idea of using windmills to produce electric power is not new. In typical operation, a windmill is used to turn an electric generator, which charges a number of storage batteries. Inverters are then used to change the D.C. voltage of the batteries to the desired A.C. frequency and voltage. Directly driving an electric generator by a windmill has disadvantages, one of which is the fact that the generator must be voltage regulated. When the speed of the generator is such that the voltage output is higher than the designed battery voltage, the charging circuit must be opened so that the batteries are not damaged, and also when the speed of the generator is such that the output voltage is below the designed battery voltage, the circuit must be opened so that the batteries do not discharge back through the generator. Thus there are times when the wind is blowing but the batteries are not being charged. Even with mechanical speed regulators, the full kinetic energy of the wind cannot be taken advantage of.

Another method for using the windmill to produce electric power is to have it drive a reciprocating air compressor. The compressed air produced is then used to power a compressed air motor which in turn drives an electric generator. The compressed air should be stored in a large reservoir of tanks designed for holding pressurized gases to act as a buffer and supply a constant air pressure to the air motor when there is little or no wind thus keeping the generator speed and output voltage constant. This system overcomes the wasted motion of the windmill which occurs in the storage battery since the air compressor operates 100% of the time when the wind mill is turning.

The electric power generated may be placed directly on transmission lines, but a more practical use of the system is to use the power to turn water into hydrogen and oxygen by the process of electrolysis. A direct current generator would be needed for this. The hydrogen and oxygen can be stored in pressurized tanks. The hydrogen can be pumped by underground pipes to existing generating stations after they have been converted to burn hydrogen. The oxygen can be used to burn the many tons of rubbish produced each day by many large cities, the thermal energy being used to power generating stations designed for this purpose. Since combustion in oxygen is complete, there would be no air pollution.

The use of windmill powered air compressors does have one problem however. In the conventional use of air compressors, the compression rings of the reciprocating pistons operate effectively because of the high speed of the pistons. On each compression stroke the piston is moving too fast for the air in the cylinders to leak around the inside of the compression rings, and the air becomes compressed. If the compressor is turned by a windmill, assuming a turning ratio of 1 to 1 between the windmill and the compressor, the relatively low speed of the windmill will cause the conventional compression rings to become ineffective since the air in the cylinder has more time to leak around the compression rings and the ability of the piston to compress air will be reduced or lost completely. The problem in using windmill powered air compressors to generate electric power then becomes one of constructing an air seal between the piston and cylinder wall which is effective at low piston speeds.

This can be accomplished by casting the compression ring, from molten metal, around the piston while it is in position within the cylinder. The ideal metal is one which would have a fairly low melting temperature when compared to the metal of the piston or cylinder so that it will not fuse to the cylinder wall, and one with a coefficient of expansion as close as possible to that of the piston and cylinder.

Casting the compression ring may be done as follows: It is suggested that the cylinder be air cooled, having heat radiating fins, and of the type which may be removed from the crankcase housing for ease in casting the compression ring. The piston is similar to a conventional piston except that there are no grooves for conventional compression rings and the thickness of the top of the piston is greater than usual. This is so a number of evenly spaced holes may be drilled into the side of the piston around its perimeter near the top. When the ring is cast, the molten metal will flow into these holes and permanently connect the compression ring to the piston upon cooling. The cylinder head and gasket are removed from the cylinder and replaced with asbestos board and a steel plate, both of uniform thickness and equal in diameter to the outside diameter of the cylinder. The asbestos board is placed between the top of the cylinder and the steel plate and both are bolted to the cylinder with bolts having counter sunk heads. This is done to keep the outside surface of the steel plate flat. The cylinder is then inverted and placed with the steel plate down upon a level non-flammable surface. The wrist pin is removed from the piston and the piston is placed in the cylinder with its top resting on the asbestos board. A wood or metal sleeve is placed around the piston to center it in the cylinder. The piston is clamped or fixed in position in the cylinder so that it cannot move with respect to the cylinder. The wood or metal sleeve is then removed. The compression ring is now ready to be cast. The desired amount of molten metal is chosen and poured into the space between the cylinder wall and piston and allowed to cool. The steel plate, asbestos board, and piston are then removed. The piston may require the use of a hydraulic press to remove it. The wrist pin is replaced, and since the cylinder must be lubricated an oil wiping ring may be added. A thin film of oil between the cylinder wall and compression ring will increase the strength of the air seal. The piston is replaced in the cylinder and the compressor reassembled. When in operation the cylinder and compression ring will be subject to the heat of compression and a gap due to unequal expansion of the ring and cylinder may develop. For this reason, the cylinder or cylinders should be kept as cool as is practically possible. The efficiency of the piston will increase since the force turning the compressor does not have to overcome the resistance from the outward pressure of conventional compression rings.

The only disadvantage to the windmill powered air compression system for generating electric power described is the fact that it is subject to variations in the wind. This can be largely overcome by the location of the windmills in areas with fairly constant winds such as the east and west coasts of the United States, the coasts of the Great Lakes, and in high mountainous regions. Omni-directional windmills with variable pitch blades can be made to take advantage of the lightest winds.

I claim:

1. A method of producing a piston cylinder assembly for use in a windmill, the method comprising the steps of: providing a piston cylinder assembly including a cylinder with a cylinder head and gasket and a piston head having a smooth outer surface with no grooves for reception of compression rings; removing the piston head, cylinder head and gasket from the cylinder; drilling a number of holes on the side surface of the piston head; replacing the cylinder head and gasket with a layer of refractory material and an outer metal plate; positioning the piston head within the cylinder with the head resting on the refractory material; pouring molten metal into the space between the cylinder wall and the piston head; allowing the molten metal to cool to form a compression ring around the piston head and attached thereto by solidified metal within the drilled holes; removing the piston head from the cylinder; removing the layer of refractory material and outer metal plate from the cylinder and repositioning the cylinder head and gasket; and reassembling the piston head and cylinder.

* * * * *